US 6,545,243 B1

(12) United States Patent
Sorg et al.

(10) Patent No.: US 6,545,243 B1
(45) Date of Patent: Apr. 8, 2003

(54) DYNAMIC WELD POWER TERMINATION FOR HOT-STAKING ARMATURE COMMUTATORS

(75) Inventors: Frank D. Sorg, Middletown, IN (US); Ronald D. Gentry, Cicero, IN (US)

(73) Assignee: Delco Remy America, Inc., Anderson, IN (US)

( * ) Notice: Subject to any disclaimer, the term of this patent is extended or adjusted under 35 U.S.C. 154(b) by 0 days.

(21) Appl. No.: 09/952,539

(22) Filed: Sep. 14, 2001

(51) Int. Cl.$^7$ ............................................... B23K 11/24
(52) U.S. Cl. ..................................... 219/110; 219/56.22
(58) Field of Search ........................... 219/110, 56.1, 219/56.21, 56.22, 86.41, 86.51, 117.1

(56) References Cited

U.S. PATENT DOCUMENTS

| 4,001,539 A | | 1/1977 | Franchi et al. ............... 219/110 |
| 4,095,077 A | | 6/1978 | Schneider et al. ............ 219/61 |
| 4,224,496 A | | 9/1980 | Riordan et al. .............. 219/110 |
| 4,266,114 A | | 5/1981 | Hansen ....................... 219/132 |
| 4,436,982 A | | 3/1984 | Kokura et al. ............ 219/130.51 |
| 4,634,828 A | | 1/1987 | Okabe et al. .............. 219/117.1 |
| 5,063,279 A | * | 11/1991 | Rossi ....................... 219/117.1 |
| 5,111,015 A | | 5/1992 | Riordan ................... 219/56.22 |
| 5,266,767 A | | 11/1993 | Rossi ....................... 219/86.25 |
| 5,300,753 A | | 4/1994 | Rossi ....................... 219/110 |
| 5,308,948 A | * | 5/1994 | Kawagoe et al. ............ 219/110 |
| 5,478,982 A | | 12/1995 | Kirker ....................... 219/86.8 |
| 5,525,774 A | | 6/1996 | Dolgas et al. ................. 219/89 |
| 5,587,091 A | | 12/1996 | Kawagoe et al. ............ 219/110 |
| 6,093,277 A | | 7/2000 | Assink et al. ................ 156/292 |
| 6,118,095 A | | 9/2000 | Nagano ....................... 219/110 |

FOREIGN PATENT DOCUMENTS

| JP | 55156673 | 5/1979 |
| JP | 04000245 | 4/1990 |
| WO | 9723324 | 7/1997 |
| WO | 9954080 | 10/1999 |

\* cited by examiner

Primary Examiner—Clifford C. Shaw
(74) Attorney, Agent, or Firm—Ice Miller; Russell E. Fowler, II

(57) ABSTRACT

The method of the present invention involves setting a penetration threshold as well as a maximum weld time when hot staking armature conductors to the slots of a commutator. To perform each weld, an electrode is forcibly contacted with the top conductor in one of the slots of the commutator. Next, electric current is delivered to the electrode, causing the conductor to heat and begin to deform within the slot. During this time, the electrode moves further into the slot. If the electrode reaches the penetration threshold in the commutator slot before the maximum weld time is reached, current to the electrode is terminated. After terminating current to the electrode, the electrode remains in contact with and applies force to the conductor until the maximum weld time is reached. After the maximum weld time is reached, the electrode is removed from contact with welded conductor.

20 Claims, 3 Drawing Sheets

DYNAMIC WELD POWER TERMINATION FOR HOT-STAKING ARMATURE COMMUTATORS

BACKGROUND

The present invention relates to the welding of copper armature conductors to the commutator during the production of automotive starting motors.

Automotive starting motors are typically DC machines including a field winding on the stator, an armature winding on the rotor and a mechanical rectifier known as a commutator. The stator comprises a laminated ferromagnetic material equipped with protrusions around which the coils of the field winding are wrapped. The rotor includes a laminated core which is slotted to accommodate the armature winding. The armature winding is comprised of a plurality of copper armature conductors wound on the slots of the rotor. The commutator is a mechanical rectifier comprised of a plurality of parallel copper segments insulated from one another and arranged in cylindrical fashion. Carbon brushes ride on the commutator and serve to conduct direct current to the armature winding.

In production of the automotive starting motor, the copper armature conductors must be joined to the copper segments of the commutator to provide a connection between the armature winding and the commutator. The copper armature conductors are typically joined to the commutator using a process of welding commonly referred to as "hot staking." An armature 10 and hot staking machine 20 are represented in FIG. 1. Hot staking of the armature conductors 11 to the commutator 12 involves application of the tungsten electrode 22 of the hot staking machine 20 to a particular set of armature conductors 11. After the electrode 12 contacts the conductors 11, the electrode 12 is heated by passing electric current through the electrode. The electrode also applies downward force to the conductors 11 using the air cylinder 24.

FIG. 2 shows a close-up cross-sectional view of the armature conductors 11 before they are welded to the commutator 12. The commutator 12 includes a plurality of risers 30 defining slots 32. An insulator 34 separates each riser 30 of the commutator 12. The armature conductors 11 are placed in the slots 32 of the risers 30 before welding. Typically, two conductors 11 are placed in each slot 32. To join the conductors 11 to the commutator 12, the tungsten electrode 22 of the hot staking machine 20 is positioned over a slot 32 and moved downward into contact with the conductors 11, applying force to the conductors. As force is applied to the conductors, electric current is also provided to the electrode 22, causing the electrode to become heated. The combination of the heated electrode and force from the electrode softens the copper armature conductors and causes them to deform, preferably into an egg-shape. After a period of time, current to the electrode is terminated and the electrode is removed. Thereafter, the copper conductors re-harden and form a bond with the walls of the riser. After the hot staking machine 20 welds one set of conductors 11 in a slot 32, the armature is rotated to allow the hot staking machine to weld the next set of conductors in the respective slot.

A problem exists with the above-described method of heat staking because it is difficult to keep the tungsten electrode at a constant temperature. The electrode typically becomes hotter with each successive weld, as the same current is provided to the electrode during each weld and not much time is provided for cooling between welds. After several welds, the very hot electrode can cause damage by penetrating too far into the slot of the commutator when it contacts a conductor and causing the conductor to completely deform and melt into a U-shape around the electrode. These welds are faulty and are not capable of conducting current within an operating armature. Thus, there is a need in the industry for some quality control mechanism to be applied to the process of hot staking armature conductors to commutators in starter motors.

Some prior art machines and related methods have attempted to control the process of hot staking armature conductors to the commutators. A few of these methods have involved monitoring the displacement of the electrode in the slot when welding to keep the electrode from penetrating too far in the slot and resulting in a faulty weld. However, it has been noted that several of these prior art methods are overly complex and involve too many variables or are expensive to implement. For the foregoing reasons, there is a need in the industry for a relatively simple and inexpensive yet reliable method to be applied to the process of hot staking armature conductors to commutators that involves monitoring the displacement of the electrode in the slot of the commutator.

SUMMARY

The present invention is directed to an apparatus and method that satisfies the need for a relatively simple, but reliable method for producing consistent weld qualities when hot staking armature conductors to commutators in starter motors. The apparatus includes a cradle used to rotatably support and mount a commutator. The commutator includes a plurality of slots and a plurality of conductors positioned in each slot. Once mounted in the cradle, the commutator is rotatable about the commutator axis such that one of the plurality of slots faces the upward direction. The apparatus also includes an electrode that is movable in the vertical direction to contact the exposed conductor in the upward facing slot of the commutator. A sensor determines how far the electrode has traveled within the slot. A compressor is provided to force the electrode against the armature conductor and compress the conductors in the upward facing slot of the commutator. A power supply is also provided for delivering current to the electrode.

The apparatus also includes a microprocessor in communication with other elements of the apparatus to control operation of the device. To this end, the microprocessor instructs the moveable electrode to contact the exposed conductor in the upward facing slot of the commutator and apply a force to the conductor. The microprocessor also instructs the power supply to deliver current to the electrode. As current is provided to the electrode in contact with the conductor, the conductor softens and begins to weld within the slot and the electrode moves further into the slot. When the electrode reaches a threshold displacement in the slot, the sensor sends a message to the microprocessor that the threshold displacement has been reached. The microprocessor then instructs the power supply to cease current delivery to the electrode after the electrode reaches the threshold displacement. After this, the electrode continues to apply force to the conductor until the microprocessor determines that a maximum weld time has been reached. Following the maximum weld time, the microprocessor instructs the compressor to remove the electrode from the armature conductor. If the maximum weld time is reached before the microprocessor receives the signal that the electrode has reached the threshold displacement, an error condition exists in the weld and an alarm is sounded.

Accordingly, the apparatus and method of the present invention provides a relatively simple, inexpensive and reliable method for producing consistent weld qualities when hot staking armature conductors to commutators in starter motors. These and other features, aspects, and advantages of the present invention will become better understood with reference to the following description and appended claims.

DESCRIPTION

Figure 1:
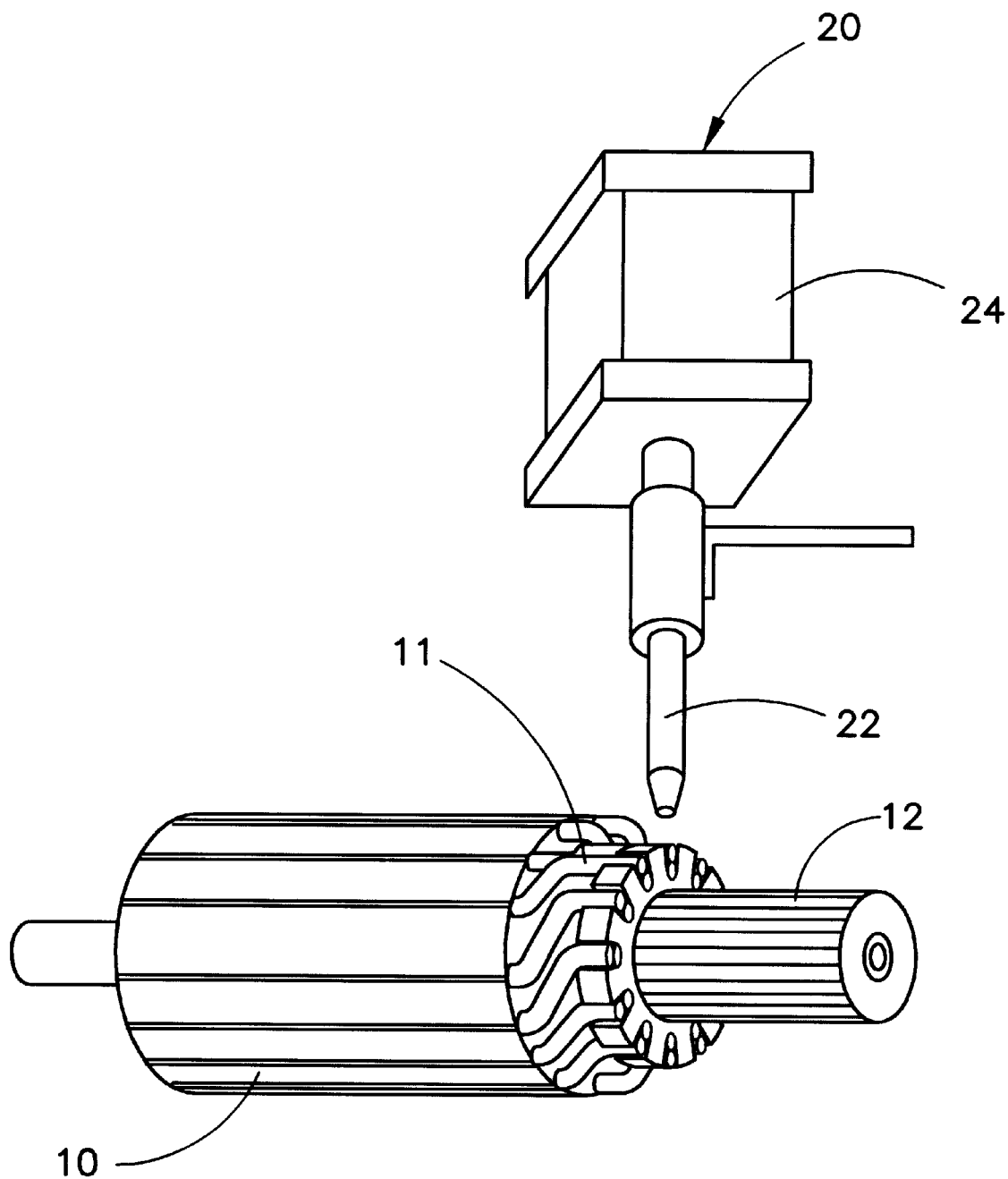
FIG. 1 shows a perspective view of an armature and a hot staking device.
Figure 2:
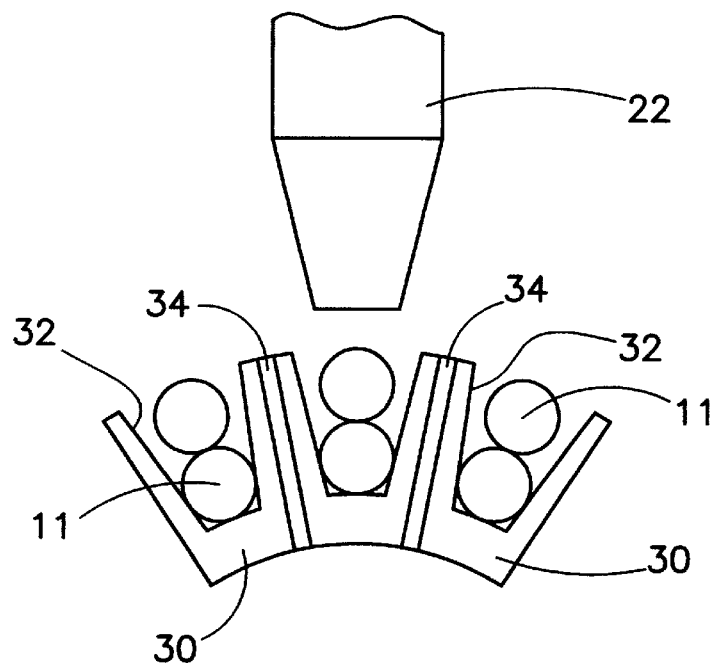
FIG. 2 shows a cross-sectional view of the slots of the armature of FIG. 1.
Figure 3:
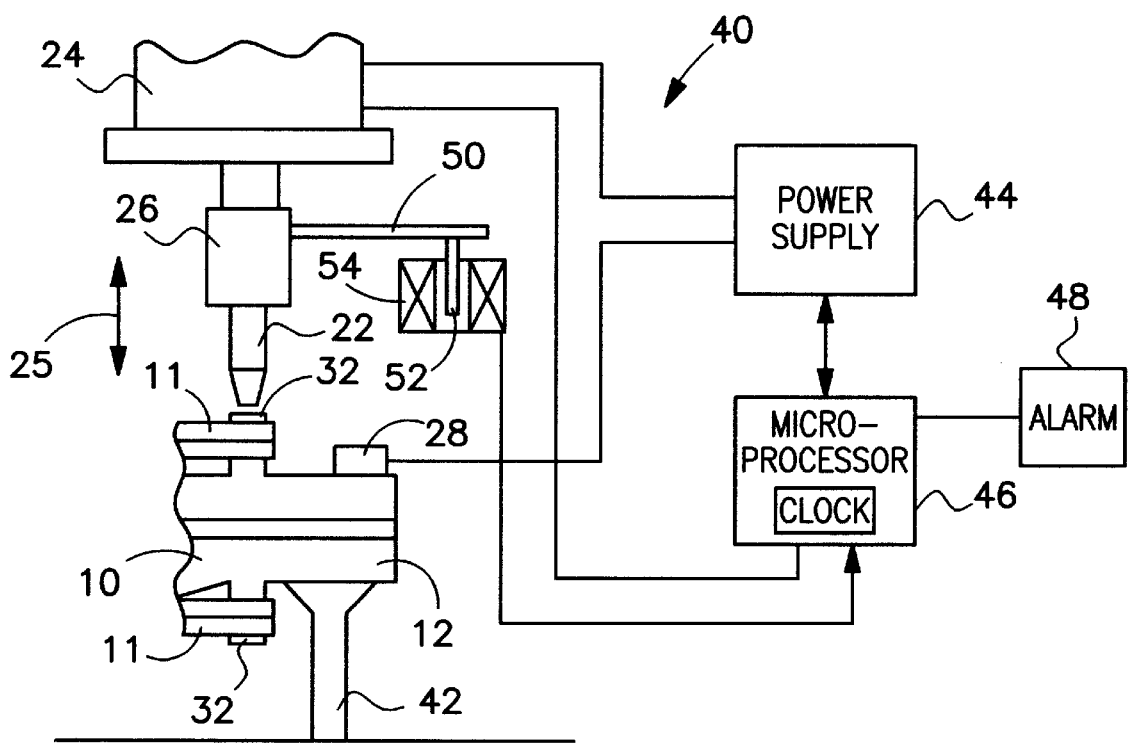
FIG. 3 shows a diagram of a hot staking device according to the present invention.

With reference to FIG. 3, one embodiment of a device 30 for welding armature conductors in the slots of a commutator 12 is shown. The device includes a cradle 42 for rotatably supporting the armature 10 at the commutator 12 and mounting the armature to the device 40. The commutator includes a plurality of slots 32 positioned radially about the commutator. Electric conductors, such as copper conductors 11 are inserted into the slots 32 of the commutator 12 to be welded to the commutator slots. FIG. 2 shows a close-up cross-sectional view of the armature conductors before they are welded to the commutator. As shown in FIG. 2, a plurality of risers 30 define the slots 32. An insulator 34 separates each riser 30 of the commutator 12.

As shown in FIG. 3, one of the slots 32 and an associated pair of conductors 11 face an electrode 22 positioned above the slot. The electrode 22 is comprised of tungsten and is held in place by a copper electrode holder 26. The electrode 22 is moveable in the vertical direction as represented by arrow 25. Above the electrode and the electrode holder is a compressor 24 in the form of an air cylinder. Of course, the compressor 24 may comprise any of a number of different types of compressors in addition to an air compressor, including a hydraulic compressor or an electric motor and gear relationship. The compressor is operable to apply a force to the electrode to encourage it in the downward direction.

A power supply 44 is also connected to the electrode. The power supply 44 provides a current source for the electrode. This current is delivered to the electrode using wiring that runs through the compressor 24 and into the electrode holder 26 where the current is then passed on to the electrode. Of course the power supply is operable to provide electric current to the electrode and also terminate electric current to the electrode. Also associated with the power supply 44 is a second terminal 28 which is slideably connected to the commutator. During operation of the welding device 10, the electrode 22 is forced into contact with the conductors 11, forming an electric circuit which runs through the commutator 12 and second terminal 28.

Extending from the electrode holder 26 is a level 50 having a pin 52 protruding downward from its end. The pin 52 forms the moveable core of a linear variable differential transformer (LVDT) position sensor 54. The LVDT position sensor 54 produces an electrical output proportional to the position of the core. Of course, any number of different types of sensors may be used instead of an LVDT position sensor, including a linear potentiometer or a laser.

The electrical output from the LVDT position sensor 54 is provided to a microprocessor 46. The microprocessor 46 is also connected to the power supply 44 and the air compressor 24. Accordingly, the microprocessor 46 controls the overall operation of the device 40. The microprocessor 46 is operable to instruct the power supply 44 to deliver current to the electrode 22 or terminate current to the electrode. In addition, the microprocessor 46 is operable to instruct the compressor 24 to move the electrode up or down with a particular force. Furthermore, the microprocessor 46 includes an internal clock that is capable of tracking the weld time and determining a total weld time for each weld made using the device 40.

An alarm 48 is also connected to the microprocessor. As explained in more detail below, the microprocessor is operable to send an electric signal to the alarm and cause the alarm to sound if the microprocessor determines that a faulty weld occurs. The alarm may be a audible alarm, such as an audible siren or a voice warning. The alarm may also be a visual alarm such as a visual siren, a flashing light, or a warning on a screen. As used herein, the term "sound" an alarm simply means to activate the alarm to draw attention to a faulty weld, whether through an audible alarm, visual alarm, or other alarm.

Figure 4:
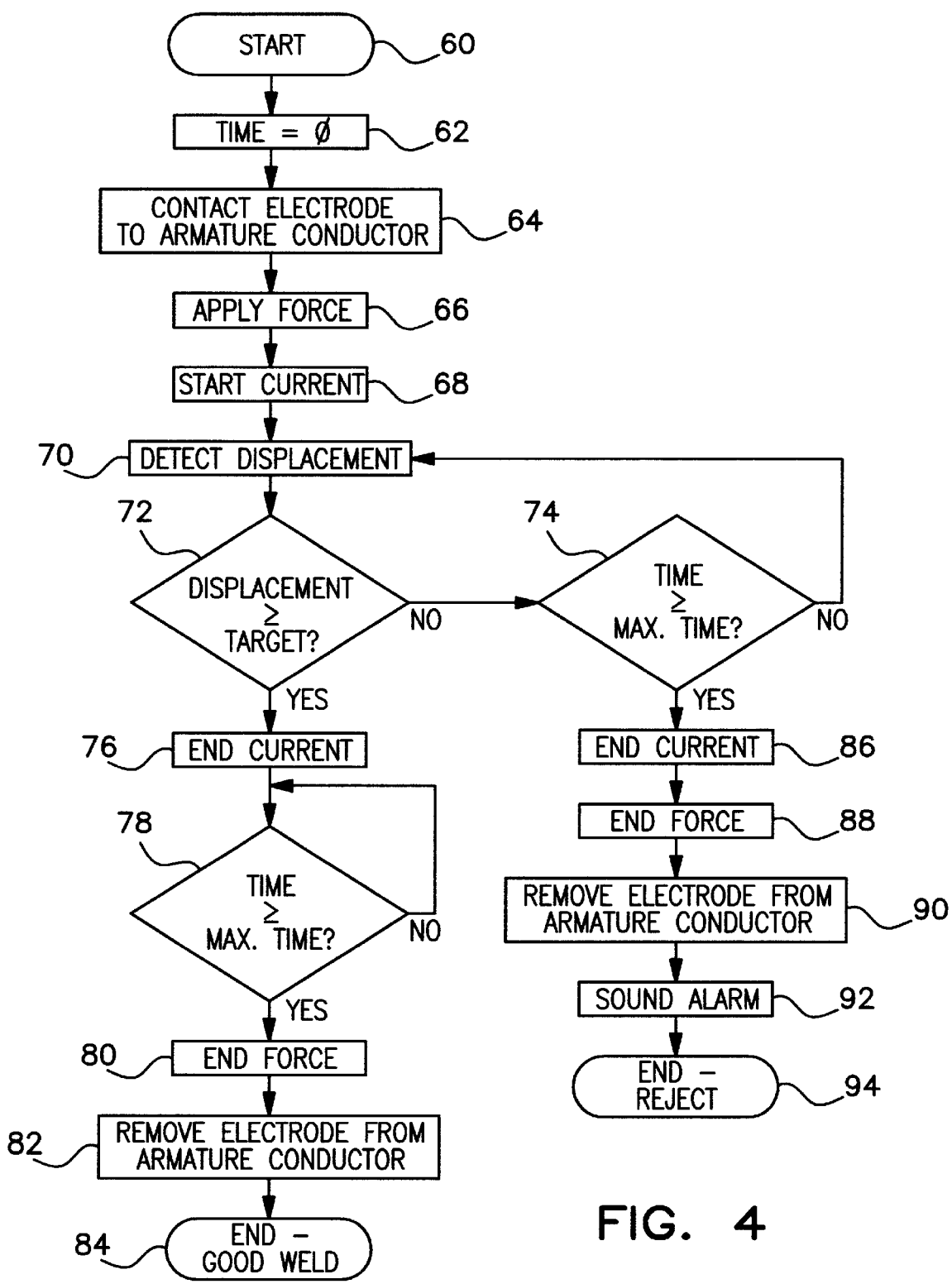
FIG. 4 shows a block diagram of a method for hot staking armature commutators using the hot staking device of FIG. 3.

With reference now to FIG. 4, operation of the device 10 to weld conductors to one of the slots of the commutator is shown. Operation of the device 10 starts in step 62 with the microprocessor setting its internal clock so that the weld time is equal to zero. Next, in step 64, the microprocessor instructs the air compressor to move the electrode down and into contact with the armature conductors positioned in the upward facing slot directly below the electrode. Once in contact with the conductors, the microprocessor instructs the compressor to continue to apply a force to the conductors. A force of three hundred (300) pounds is a typical force that is used to compress the conductors into the slot.

After the electrode is forcibly positioned against the armature conductors, the microprocessor instructs the power supply to deliver current to the electrode in step 68. The current delivered is typically in the range of three thousand (3,000) amps. This current travels through the electrode 22, conductors 11, commutator 12 and the second terminal 28 to complete the circuit. The heat of the electrode and the current passing through it causes the copper conductors to become malleable and deform within the slot. The force provided by the electrode preferably causes the conductors to deform into an oval or egg shape within the slots. Of course, because the electrode is forced against the conductors, the electrode will move within the slot as the conductors become malleable.

In step 70, the LVDT position sensor 54 detects the displacement of the electrode within the slot as electric current is delivered to the electrode and the conductors are welded in the slot. If the electrode has yet to reach a predetermined threshold displacement or displacement target, the LVDT position sensor sends a signal to the microprocessor indicating that the electrode has yet to reach the displacement target. As indicated in step 74, the microprocessor then checks the total weld time that has elapsed since the start of the weld process. If the total weld time is less than a predetermined maximum weld time, the microprocessor again checks the displacement of the electrode in the slot. This cycle continues until the displacement of the electrode in the slot reaches the target displacement or the total weld time reaches the maximum weld time.

Once the LVDT sensor determines that the electrode has reached or passed the target displacement within the slot, it signals the microprocessor that the target displacement has been reached. Thereafter, as shown in step 76, the microprocessor instructs the power supply 44 to terminate the current to the electrode. Next, in step 78, the microprocessor waits until the total weld time reaches the maximum weld time. During this time, the electrode continues to apply force to the conductors 11 in the slot 34 as the conductors begin to cool and harden in the slot. Once the maximum weld time is reached, the microprocessor instructs the compressor to discontinue the force applied by the electrode, as shown in step 80, and remove the electrode from the armature conductor, as shown in step 82. It has been determined that this process of welding wherein the electrode provides force and current to conductors until a threshold displacement is reached and then the electrode applies only force until a maximum weld time is reached provides welds of good and consistent quality. The process for obtaining such welds is also relatively easy and inexpensive to implement while still providing reliable results. As shown in step 84, if the welding process goes as described above, a good and acceptable weld results. Thereafter, the armature is rotated so a subsequent slot and associated conductors face the electrode and the above process is repeated.

Returning to step 74, if the microprocessor notes that the total weld time is equal to or has passed the maximum weld time before the electrode reaches the target displacement, an error condition results. In this situation, the microprocessor immediately instructs the power supply to terminate the current to the electrode, as shown in step 86. Also, as shown in steps 88 and 90, the microprocessor instructs the compressor to discontinue applying force to the electrode and remove the electrode from the armature conductor 11. Next, the microprocessor sends a signal to the alarm 48, causing the alarm to sound and indicate that a faulty weld has resulted.

Although the present invention has been described in considerable detail with reference to certain preferred versions thereof, other versions are possible. For example, in an alternative embodiment of the invention, a different type of displacement sensor may be used, such as a linear potentiometer or a laser. Also, alternative embodiments of the invention may involve different or additional method steps. For example, additional method steps could include use of an optical sensor to determine that a slot is properly positioned under the electrode before the electrode is brought into contact with conductors in the slot. Therefore, the spirit and scope of the appended claims should not be limited to the description of the preferred versions contained herein.

What is claimed is:

1. A method for controlling a hot staking device comprising the steps of:
   (a) bringing an electrode into contact with an armature conductor;
   (b) applying a force to the armature conductor with the electrode;
   (c) delivering current to the electrode;
   (d) terminating the electric current to the electrode after a threshold displacement has been reached; and
   (e) continuing to apply the force to the armature conductor with the electrode after terminating the electric current until a maximum weld time has been reached.

2. The method of claim 1 further comprising the step of removing the electrode from contact with the armature conductor after the maximum weld time has been reached.

3. The method of claim 2 further comprising the steps of repeating steps (a) through (e) where the armature conductor is replaced by a second armature conductor.

4. The method of claim 1 wherein electric current to the electrode is terminated before step (d) if the maximum weld time is reached before the threshold displacement is reached.

5. The method of claim 4 further comprising the step of sounding an alarm after electric current to the electrode is terminated.

6. A method for controlling a hot staking device comprising the steps of:
   (a) bringing an electrode into contact with an armature conductor;
   (b) applying a force to the armature conductor with the electrode;
   (c) delivering a current to the electrode;
   (d) detecting a displacement of the electrode;
   (e) tracking a weld time;
   (f) if the displacement of the electrode reaches a threshold displacement before the weld time reaches a maximum weld time, terminating the electric current to the electrode and continuing to apply the force to the armature conductor with the electrode after terminating the electric current until the weld time reaches the maximum weld time; and
   (g) if the weld time reaches the maximum weld time before displacement of the electrode reaches the threshold displacement, terminating the electric current to the electrode and sounding an alarm.

7. The method of claim 6 further comprising the step of removing the electrode from contact with the armature conductor after the maximum weld time has been reached.

8. The method of claim 6 wherein an air compressor is used to apply force to the electrode.

9. The method of claim 6 wherein an LVDT position sensor is used to detect the displacement of the electrode.

10. The method of claim 6 further comprising repeating steps (a)–(e) for a subsequent armature conductor if step (g) is not executed.

11. A device for welding armature conductors in the slots of a commutator, the device comprising:
   (a) means for bringing an electrode into contact with an armature conductor;
   (b) means for applying a force to the armature conductor with the electrode;
   (c) means for delivering current to the electrode;
   (d) means for terminating the electric current to the electrode after a threshold displacement has been reached; and
   (e) means for continuing to apply pressure to the armature conductor with the electrode after terminating electric current until a maximum weld time has been reached.

12. The device of claim 11 wherein the means for applying a force is an air compressor.

13. The device of claim 11 further comprising an alarm operable to sound if the maximum weld time is reached before the electrode has reached the threshold displacement.

14. The device of claim 11 further comprising a displacement sensor used to determine the threshold displacement.

15. The device of claim 11 further comprising a microprocessor used to determine the maximum weld time.

16. A device for welding an armature conductor in the slot of a commutator, the device comprising:
   (a) a cradle for rotatably supporting the commutator;
   (b) a moveable electrode operable to contact the armature conductor in the slot of the commutator supported by the cradle;

(c) a compressor operable to force the electrode against the armature conductor;
(d) a current source for delivering current to the electrode;
(e) a sensor for determining a threshold displacement of the electrode;
(f) a microprocessor operable to
 (i) instruct the compressor to force the electrode against the armature conductor;
 (ii) instruct the current source to deliver current to the electrode after the compressor forces the electrode against the armature conductor;
 (iii) receive a signal from the sensor when the electrode reaches the threshold displacement;
 (iv) instruct the current source to cease current delivery to the electrode after the electrode reaches the threshold displacement;
 (v) determine a total weld time; and
 (vi) instruct the compressor to remove the electrode from the armature conductor when the total weld time is greater than or equal to a maximum weld time.

17. The device of claim 16 wherein the compressor is an air compressor.

18. The device of claim 16 further comprising an alarm operable to sound if the maximum weld time is reached before the microprocessor receives the signal that the electrode has reached the threshold displacement.

19. The device of claim 18 wherein the alarm is an audible alarm.

20. The device of claim 16 wherein the displacement sensor is an LVDT sensor.

* * * * *